(12) United States Patent
Kaku (10) Patent No.: US 7,408,961 B2
(45) Date of Patent: Aug. 5, 2008

(54) HIGH SPEED SERIAL DATA TRANSPORT BETWEEN COMMUNICATIONS HARDWARE MODULES

(75) Inventor: Vicky B. Kaku, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1053 days.

(21) Appl. No.: 10/124,610

(22) Filed: Apr. 16, 2002

(65) Prior Publication Data

US 2003/0056049 A1    Mar. 20, 2003

Related U.S. Application Data

(60) Provisional application No. 60/322,063, filed on Sep. 13, 2001.

(51) Int. Cl.
*H04J 3/04* (2006.01)
*H04J 3/02* (2006.01)
(52) U.S. Cl. .................. 370/535; 370/537; 370/542
(58) Field of Classification Search ............ 370/537, 370/542
See application file for complete search history.

(56) References Cited

U.S. PATENT DOCUMENTS

| 4,417,245 | A | * | 11/1983 | Melas et al. ............ 340/2.22 |
| 4,644,346 | A | * | 2/1987 | Ito et al. ............... 370/366 |
| H967 | H | * | 9/1991 | Mariotti ............... 370/537 |
| 5,428,806 | A | * | 6/1995 | Pocrass ................ 710/104 |
| 5,611,038 | A | | 3/1997 | Shaw et al. |
| 5,615,323 | A | | 3/1997 | Engel et al. |
| 5,787,248 | A | | 7/1998 | Zupcsics |
| 5,801,781 | A | * | 9/1998 | Hiroshima et al. ........ 348/441 |
| 5,802,103 | A | * | 9/1998 | Jeong .................. 375/220 |
| 5,825,775 | A | | 10/1998 | Chin et al. |
| 5,850,179 | A | * | 12/1998 | Holmlund et al. ........ 340/518 |
| 5,867,483 | A | | 2/1999 | Ennis, Jr. et al. |

(Continued)

FOREIGN PATENT DOCUMENTS

EP    0 963 076    12/1999

(Continued)

OTHER PUBLICATIONS

Datasheets: CPX8216, CPX8000 Family, Motorola, Sep. 2001 (12 pages).

(Continued)

*Primary Examiner*—Edan Orgad
*Assistant Examiner*—Blanche Wong
(74) *Attorney, Agent, or Firm*—Stewart M. Wiener (57) ABSTRACT

Transcoder multiplexers that transport digital packets, such as MPEG2 packets, between boards in a chassis using a serial differential protocol are disclosed. The disclosed multiplexers achieve data transfer rates at least twice as fast as conventional systems. Digital data packets are thereby efficiently communicated to target processing engines on other boards across the backplane. Prior art requirements for custom backplane designs, together with discrete hardware for sending data in parallel form between boards, are obviated. Instead, a backplane architecture designed specifically for IP data traffic from any slot to any slot is utilized. Also, an improved protocol is applied for transmitting data serially between boards to provide an inexpensive, upgradeable and flexible hardware solution. Preferred embodiments use LVDS transmitter/receiver pairs with high link speeds.

24 Claims, 10 Drawing Sheets

U.S. PATENT DOCUMENTS

| | | | |
|---|---|---|---|
| 5,886,995 A | | 3/1999 | Arsenault et al. |
| 5,923,811 A | * | 7/1999 | Kawamura et al. ............ 386/65 |
| 5,982,309 A | * | 11/1999 | Xi et al. ...................... 341/101 |
| 5,987,518 A | | 11/1999 | Gotwald |
| 6,028,643 A | * | 2/2000 | Jordan et al. ................ 348/552 |
| 6,098,133 A | * | 8/2000 | Summers et al. ............ 710/107 |
| 6,160,797 A | | 12/2000 | Robert, III et al. |
| 6,181,697 B1 | | 1/2001 | Nurenberg et al. |
| 6,182,129 B1 | | 1/2001 | Rowe et al. |
| 6,182,249 B1 | | 1/2001 | Wookey et al. |
| 6,199,133 B1 | * | 3/2001 | Schnell ....................... 710/110 |
| 6,222,380 B1 | * | 4/2001 | Gerowitz et al. .............. 326/38 |
| 6,269,398 B1 | | 7/2001 | Leong et al. |
| 6,356,567 B2 | * | 3/2002 | Anderson et al. ........... 370/516 |
| 6,388,658 B1 | * | 5/2002 | Ahern et al. ................ 345/168 |
| 6,418,142 B1 | * | 7/2002 | Wolf .......................... 370/390 |
| 6,448,815 B1 | * | 9/2002 | Talbot et al. .................. 326/86 |
| 6,577,325 B1 | | 6/2003 | Tadokoro et al. |
| 6,578,077 B1 | | 6/2003 | Rakoshitz et al. |
| 6,605,120 B1 | | 8/2003 | Fields et al. |
| 6,611,526 B1 | * | 8/2003 | Chinnaswamy et al. ..... 370/406 |
| 6,731,741 B1 | * | 5/2004 | Fourcand et al. ....... 379/221.08 |
| 6,763,377 B1 | | 7/2004 | Belknap et al. |
| 6,781,981 B1 | * | 8/2004 | Kimbrough ................ 370/352 |
| 6,816,903 B1 | | 11/2004 | Rakoshitz et al. |
| 6,845,131 B1 | * | 1/2005 | Ward et al. .................. 375/295 |
| 6,847,652 B1 | * | 1/2005 | Fourcand et al. ............ 370/438 |
| 6,850,976 B1 | | 2/2005 | Xia |
| 7,010,612 B1 | * | 3/2006 | Si et al. ...................... 709/232 |
| 2002/0035659 A1 | * | 3/2002 | Kelly ......................... 710/317 |

FOREIGN PATENT DOCUMENTS

| | | |
|---|---|---|
| WO | WO 97/20413 | 6/1997 |
| WO | 99 34544 | 7/1999 |
| WO | WO 01/15455 | 3/2001 |
| WO | 01/48983 | 7/2001 |

OTHER PUBLICATIONS

Advanced Television Systems Committee (ATSC), *ATSC Standard: Delivery of IP Multicast Sessions over Broadcast*, Doc. A/92, Jan. 31, 2002, pp. 1-42.

Mack, B., Society of Cable Telecommunications Engineers, Inc. (SCTE), *ATVEF Binding for Digital MPEG Networks*, SCTE DVS 311, Feb. 2, 2000, pp. 1-13.

Advanced Television Systems Committee (ATSC), *ATSC Data Broadcast Standard*, Doc. A/90, Jul. 26, 2000, pp. 1-94.

Clausen, Horst D., et al., *MPEG-2 as a Transmission System for Internet Traffic*, IEEE International Performance, Computing and Communications Conference (IPCCC), Feb. 16-18, 1998, pp. 101-107.

*ATSC IP Multicast Data Standard (Draft)*, Doc. S13-12r5, Draft 05, Jan. 23, 2001, pp. i-iii, 1-13, 16, 35-36.

Terayon Communication Systems Product Brochure, *Cherrypicker 500*, Nov. 2000.

Terayon Communication Systems Product Brochure, *Cherrypicker 600*, Nov. 2000.

Terayon Communication Systems Product Brochure, *Cherrypicker Ad Splicer*, Nov. 2000.

Terayon Communication Systems Product Brochure, *Cherrypicker National Control*, Nov. 2000.

Terayon Communication Systems Product Brochure, *Cherrypicker GUI*, Apr. 2001.

Bigband Networks, Inc. Product Brochure, *BMR 100 Broadband Multimedia-Service Router for Cable Networks*, 2000.

Bigband Networks, Inc. Product Brochure, *BMR 1200 Broadband Multimedia-Service Router for Cable Networks*, 2000.

Bigband Networks, Inc. Product Brochure, *BMR Management Suite*, 2001.

Bigband Networks, Inc. Promotional Article, *The BMR-100-Next Generation Grooming*, www.bigbandnet.com/popup/bmr.htm, 3 pages, publication date unknown.

Keller, R., et al., "An Active Router Architecture for Multicast Video Distribution", IEEE INFOCOM 2000, Mar. 26, 2000, pp. 1137-1146.

Computer Automation Systems, Inc., Integral Monitor Chassis 6U (10.5"),online 1999, pp. 1-2, XP002212597, http://www.casil.com/monitor6U.htm.

Virmani, A., et al., "Netmon: Network Management for the SARAS Softswitch", IEEE Conference 2000, pp. 803-816.

Atzori, L., et al., "Multimedia Information Broadcasting Using Digital TV Channels," IEEE Transactions on Broadcasting, vol. 43, No. 3, Sep. 1997, pp. 242-251.

Crinon, R. J., "ATSC Data Broadcast Services: Protocols, Application Signaling, Buffer Models, Profiles and Levels," International Conference on Consumer Electronics (ICCE), IEEE, Jun. 22, 1999, pp. 4-5.

* cited by examiner

HIGH SPEED SERIAL DATA TRANSPORT BETWEEN COMMUNICATIONS HARDWARE MODULES

CROSS REFERENCE TO RELATED APPLICATION

This application claims the benefit under 35 U.S.C. §119(e) of now abandoned U.S. Provisional Application Ser. No. 60/322,063, filed Sep. 13, 2001 and entitled "HIGH RATE SERIAL DIFFERENTIAL PROTOCOL FOR MPEG2 PACKET TRANSPORT"; which Provisional Application is hereby incorporated by reference.

BACKGROUND OF THE INVENTION

1. Field of the Invention

The present invention is directed to systems, methods, protocols, apparatus and related software for high-speed data communications. More particularly, the invention relates to the transport of digital data between communications hardware in accordance with a differential serial Internet Protocol (IP). Accordingly, the general objects of the invention are to provide novel systems, methods, apparatus and software of such character.

2. Description of the Related Art

With the rise of the information age in recent years, digital communications hardware has become much more sophisticated and specialized in an effort to satisfy the ever-increasing demand for faster delivery of an increasing number of information transfer options. For example, the typical modern communications system may include one or more signal receivers, decoders, modulators, data servers, streaming video servers, transaction, billing and conditional access processors, communication controllers and/or broadband media routers. Broadband media routers and/or Transport Multiplexers (TMXs) are particularly important and are generally used to multiplex data streams or to re-multiplex data streams that have previously been multiplexed. In particular, broadband media routers are used to groom multiple transport streams, such as MPEG2 (Moving Picture Experts Group) encoded video streams, and to thereby produce output streams for video appliances such as digital televisions, personal versatile recorders (PVR), and the like. The grooming provided by a broadband media router can include, for example, transcoding, advertisement insertion, adding IP opportunistic data, re-multiplexing incoming services to provide a new channel line-up, etc. While these features make such routers important devices in modern digital communications systems, conventional routers impose serious limitations on the rate of information transfer through these communications systems.

Broadband media routers typically comprise various hardware components and, since it is necessary to communicate signals between these various components, this hardware must be communicatively linked together. These components are typically linked with the use of a backplane which is a circuit board that serves to interconnect such components situated on shelves within a rack or chassis. Custom backplane designs have been the typical solution for interconnecting components in a particular way in order to achieve the desired functionality. Such custom designs incorporate discrete hardware to send data in parallel form between the different components (e.g., circuit boards) connected by the backplane. While effective to a degree, these custom designs are expensive, single use solutions and are, therefore, neither efficient nor cost-effective. They, additionally, are bandwidth limited, which poses limitations on the systems with which they are used.

There is, accordingly, a need in the art for novel methods, systems and apparatus that obviate the related art requirements for and limitations of custom backplane designs and their associated discrete hardware. The present invention provides a solution having the aforementioned and other advantages.

SUMMARY OF THE INVENTION

One form of the present invention satisfies the above-stated needs and overcomes the above-stated and other deficiencies of the related art by providing a high speed Internet Protocol communications system, such as a transport multiplexer, for serially transporting digital data between communications hardware. The system includes a chassis and a plurality of boards communicatively linked together via the chassis. The chassis receives the plural boards and has a backplane (or, alternatively, a mid-plane) with a control data bus and a serial content data bus for communicatively linking the plural boards together. The plural boards can comprise an input board for receiving a parallel data stream and for transmitting a differential serial data stream to the serial data bus. The input board has a serializer for converting the processed parallel data stream into the serial data stream and a transmitter for transmitting the serial data stream to the serial data bus of the chassis. The system also has at least one other board with a serial data receiver and a deserializer. The receiver preferably receives the serial data stream from the serial data bus and a deserializer with clock recovery. The received serial data stream is then converted into an output data stream in accordance with control signals received via the control data bus.

In various preferred embodiments of the invention the communications system can be a transport multiplexer wherein the serial data transported between the communications hardware via the serial data bus comprises MPEG2 encoded data packets. In this embodiment, each of the data packets preferably comprises a header having target media accelerator processor data, an MPEG2 data packet and a footer having a time stamp.

As a preferred feature of the invention, the transmitter can be a low voltage differential signal transmitter, the receiver can be a low voltage differential signal receiver and data can be transported unidirectionally from the transmitter to the receiver.

In some of these preferred embodiments of the invention, the input board can have, e.g., eleven low voltage differential signal transmitters, and the other boards can have, e.g., four low voltage signal receivers. This particular configuration of the inventive system enables the rate of the serial data transport from the input board to the other boards to reach at least about 324 Mbps. Alternative embodiments can use up to twelve transmitters and twelve receivers per board.

In some embodiments of the invention, some of the communicatively linked boards may be transcoder boards with a low voltage differential signal receiver for receiving the serial data stream via the serial data bus and a media accelerator processor for generating the output data stream. Other boards may be time division multiplexer boards with at least one media accelerated processor and at least one low voltage signal receiver for receiving the serial data stream via the serial data bus. Some embodiments of the invention can also include a CPU board that is communicatively linked to the input board via the control data bus. Also, the input board of the invention can be implemented as a field programmable gate array that performs packet identifier filtering, performs packet identifier aliasing and determines where to send, or transmit, the serial data.

In accordance with method embodiments of the invention, methods are provided for using an Internet Protocol backplane to communicate digital packets between boards in a chassis. A serial differential protocol can be used for packet communication. This provides for the transport of the packets at a higher rate than was possible with the related art.

Other apparatus embodiments of the invention can include a high speed Internet Protocol backplane (or a mid-plane) for communicatively linking an input board with at least one other board. In these embodiments, the backplane preferably includes a cPCI control data bus for delivering control data to the other board and a serial data bus for serially delivering content data from the input board to the other board, wherein the control data bus and the serial data bus comprise independent communications pathways linking the input board and the other board together.

The invention also encompasses methods for serially transporting digital data between communications hardware. Some of these method embodiments of the invention include communicatively linking the communications hardware via a control data bus and a serial content data bus, receiving a parallel data stream, serializing the parallel data stream, transmitting the serialized data stream to the serial data bus, receiving the serialized data stream via the serial data bus, and converting the received serial data stream into an output data stream in accordance with control signals received via the control data bus.

Naturally, the above-described methods of the invention are particularly well adapted for use with the above-described apparatus of the invention. Similarly, the apparatus embodiments of the invention are well suited to perform the inventive methods noted above.

Numerous other advantages and features of the present invention will become apparent to those of ordinary skill in the art from the following detailed description of the preferred embodiments, from the claims and from the accompanying drawings.

BRIEF DESCRIPTION OF THE DRAWINGS

The preferred embodiments of the present invention will be described in detail below with reference to the accompanying drawings where like numerals represent like steps and/or structures and wherein.

DETAILED DESCRIPTION OF THE PREFERRED EMBODIMENTS

Figure 1:
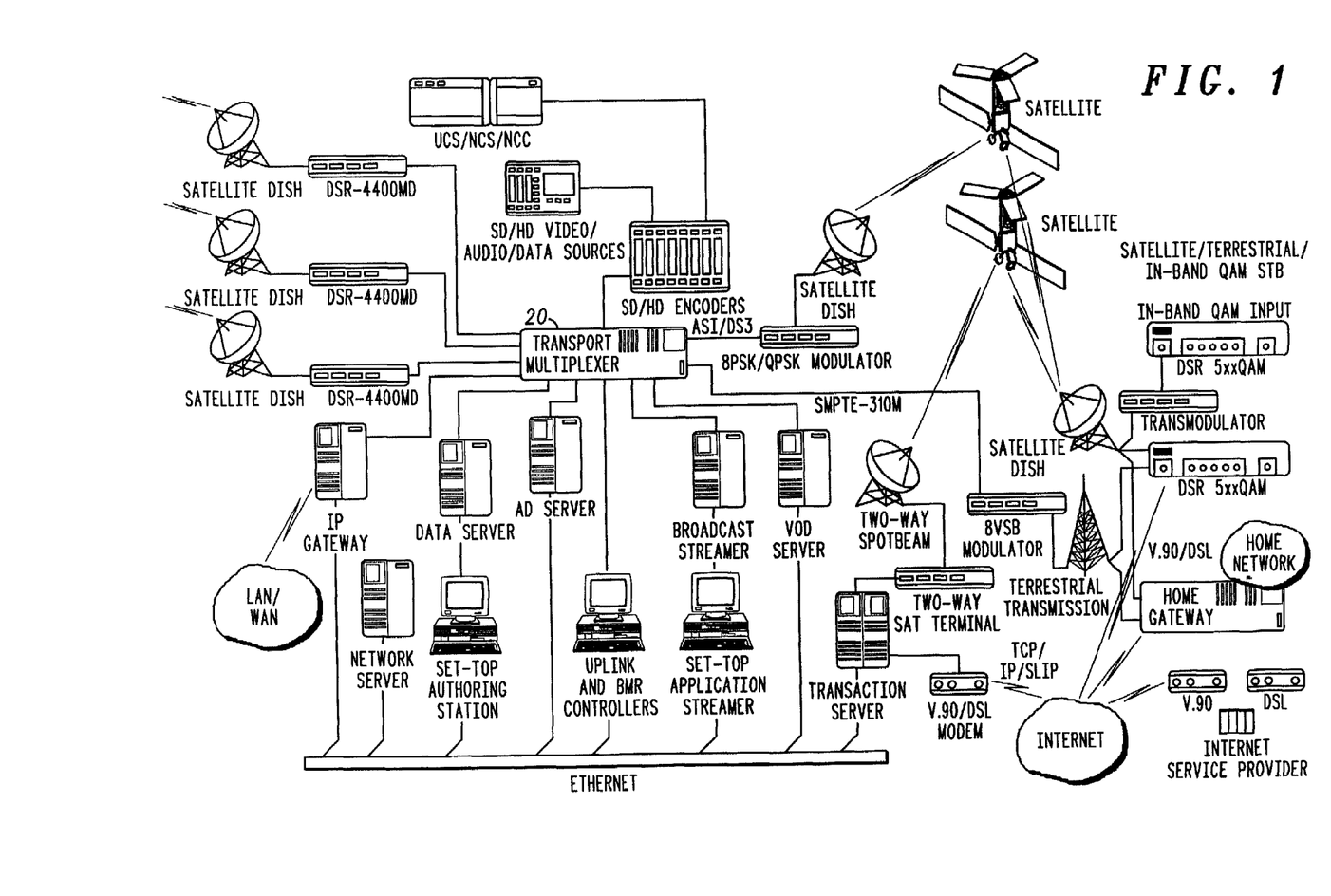
FIG. 1 is a diagram illustrating use of a transport multiplexer in accordance with the present invention, the TMX being shown in combination with various other equipment.

FIG. 1 is a high-level system diagram showing a representative application for an inventive TMX 20, TMX 20 being shown in combination with a control system and various other equipment. The TMX system can utilize, for example, Motorola Computer Group's (MCG) chassis, the CPX8216IP, or the customized CPX1205IP chassis for low end needs. The CPX8216IP is a 16 slot 12RU chassis while the CPX1205IP is a five slot 3RU chassis. One desirable feature of the CPX8216IP backplane is that it has two domains and, therefore, can be made to be completely 1:1 redundant. The CPX8216IP and CPX1205IP are compact PCI chassis. Both fit into an 18" deep rack, accept cards from the front and rear, and can be equipped with either AC or DC power supply modules.

Figure 2:
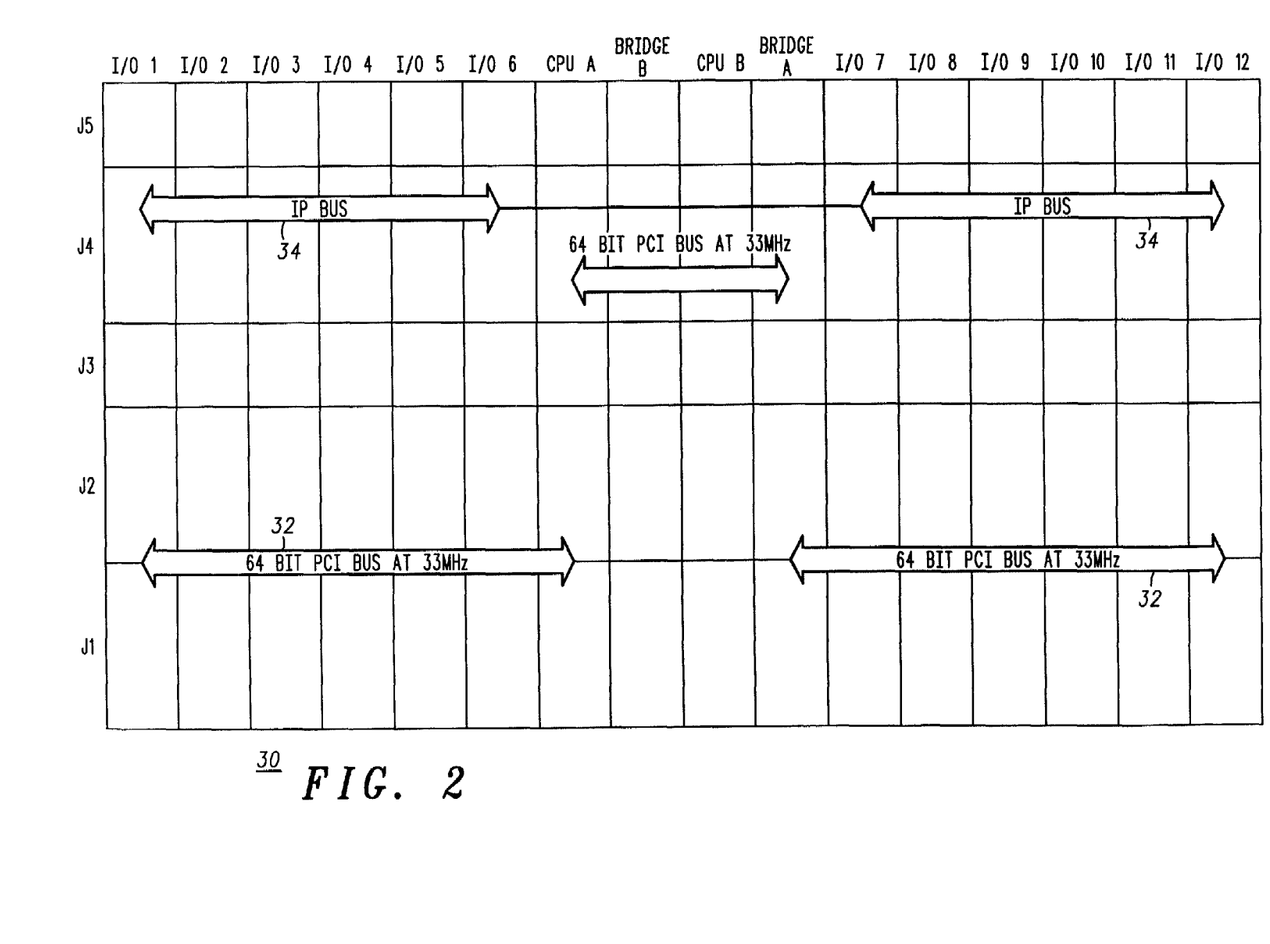
FIG. 2 is a diagram showing a representative data transport scheme for a TMX backplane in accordance with one embodiment of the invention.
Figure 3:
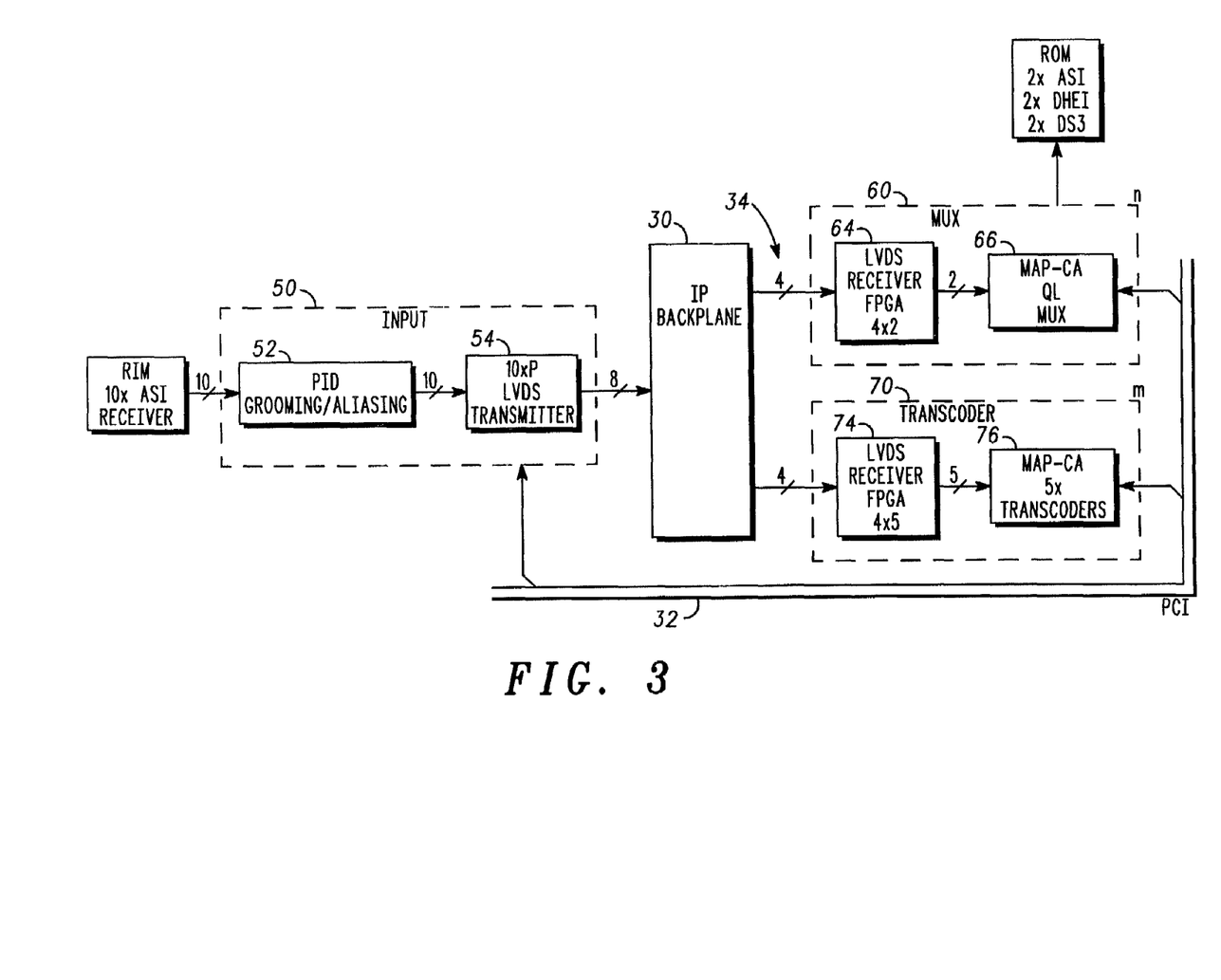
FIG. 3 is a block diagram showing the use of an Internet Protocol (IP) bus in a representative TMX in accordance with a preferred embodiment of the invention.
Figure 5:
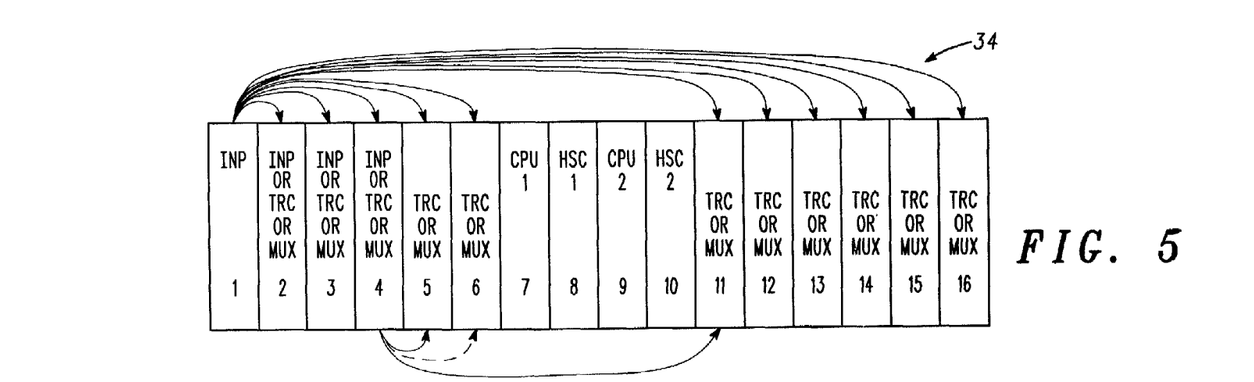
FIG. 5 illustrates the IP for the TMX of FIG. 3, and in particular the input (INP), transcoder (TRC) and/or multiplexer (MUX), central processing unit (CPU) and hot swap controller (HSC) boards in a larger chassis.
Figure 7:
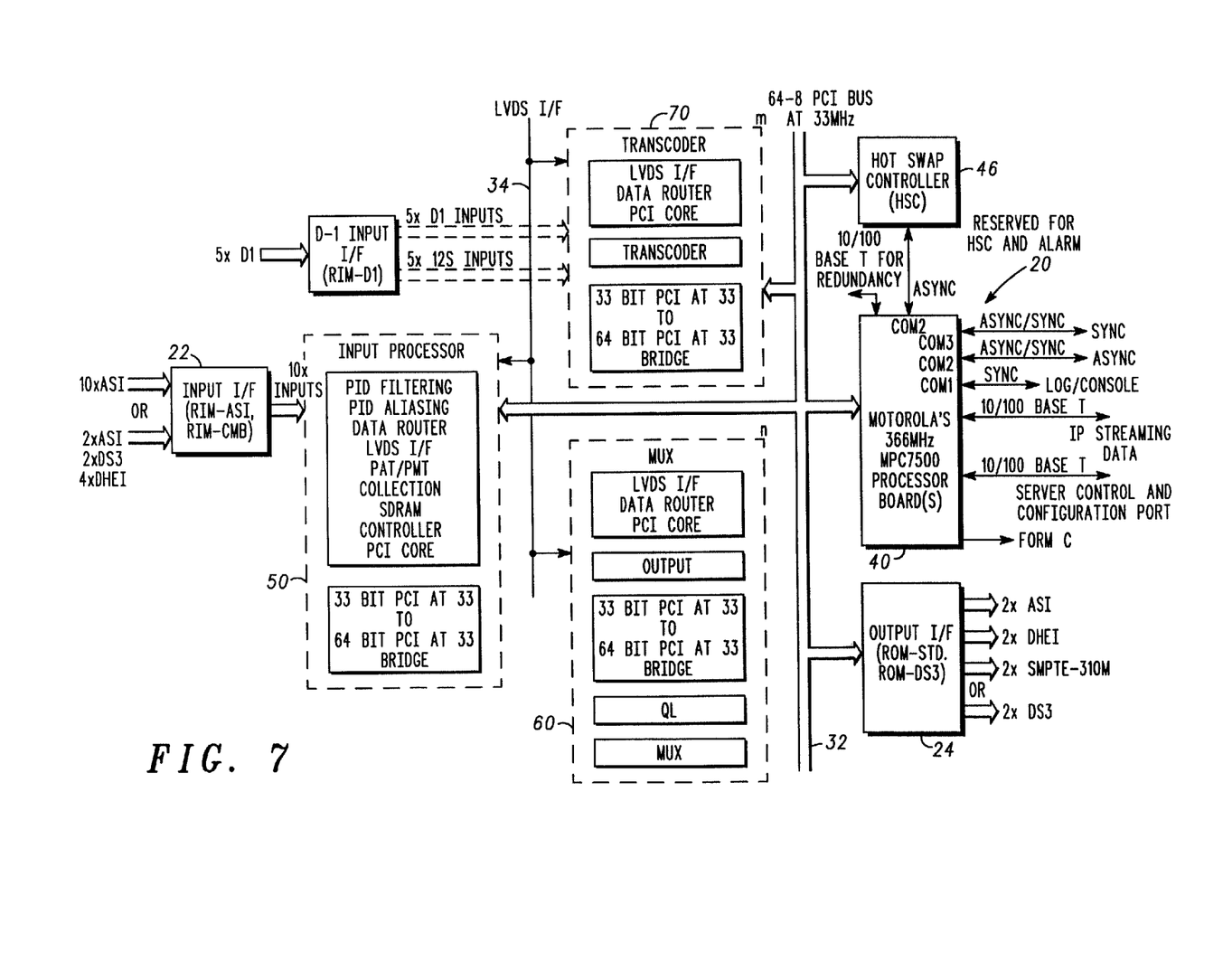
FIG. 7 is a high-level block diagram of a TMX in accordance with a preferred embodiment of the present invention.

As illustrated in FIGS. 2, 3 and 7, each of these chassis has a backplane 30 (or, more particularly, a special type of backplane known as a mid-plane) with two independent communication buses. These are (i) a compact PCI (cPCI) (bus 32), which is 64 bits wide and runs at 33 MHz; and (ii) a serial IP interconnect (bus 34). The IP bus 34 can be either a unidirectional or a bidirectional IP bus over which data can be sent to or received from any board up to a rate of 1 GHz. One preferred configuration for the 8216IP chassis is shown in FIG. 5. In this embodiment, the four center slots of the 8216IP chassis preferably receive two host CPUs and two Hot Swap Controller (HSC) cards 46. The HSC card 46 serves two primary purposes: (i) to bridge the two PCI domains so as to appear as one twelve slot PCI bus (instead of two six slot PCI buses as is the case for redundancy); and (ii) to provide hot swap functionality. Other configurations within the scope of the invention are possible. For example, the 8216IP chassis could be equipped with a single CPU board.

Figure 6:
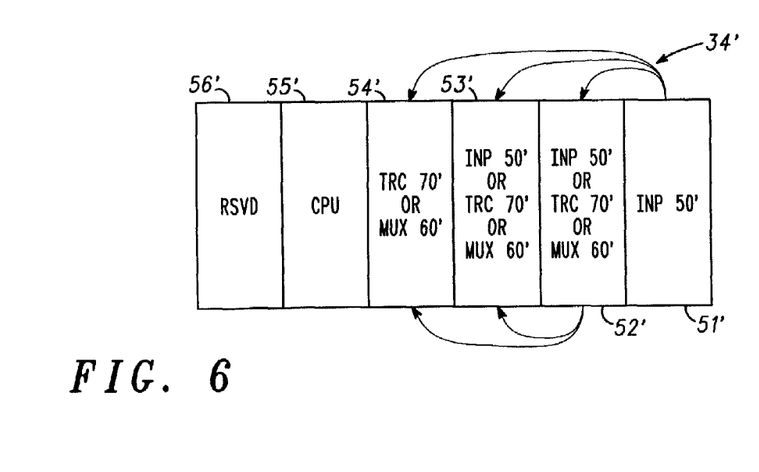
FIG. 6 summarizes the IP bus of FIG. 5 for a smaller chassis in accordance with an alternative embodiment of the present invention.

As noted above, each of the CPX8216IP and the CPX1205IP chassis has two independent communication pathways; namely, the cPCI bus 32 allowing for configuration and control, and the passage of compressed bitstreams to MUX 60; and the IP interconnect bus 34 over which incoming data can be distributed to any card such as representative Transcoder card (TRC) 70' or the MUX card 60'. In accordance with a preferred embodiment of the present invention, in order to route MPEG2 packets to any processor on any board, the IP interconnect bus 34 is preferably used to route MPEG2 packets. This is preferably accomplished by utilizing a family of devices called SerDes, which serialize and de-serialize data. Serializers and de-serializers, which incorporate clock recovery on the deserializer end, allow for a serial link across backplane 30 to pass data from board to board. A particularly preferred embodiment uses a serializer/deserializer pair whose serial link is a low voltage differential signal (LVDS). As indicated, e.g., in FIG. 6, the system will define fixed locations across backplane 30 which are capable of receiving input cards such as input card 50'. The remainder of the available slots or locations are preferably reserved for the TRC or MUX card (70' and 60', respectively). Input board 50' will have serializers 54 installed, while the TRC and MUX cards (70' and 60') will have the de-serializers (74 and 64, respectively) and plural media accelerated processors installed. Any incoming packet can be routed to any target Media Accelerated Processor (MAP) (e.g., 66 or 76) on any target card. In order to control this flow of routing information, both aforementioned preferred chassis are capable of receiving a CPU card 40, e.g., a Motorola 750 PowerPC based CPU card (see especially, FIGS. 4 and 7). Those skilled in the art will appreciate that other implementations are also possible.

Figure 4:
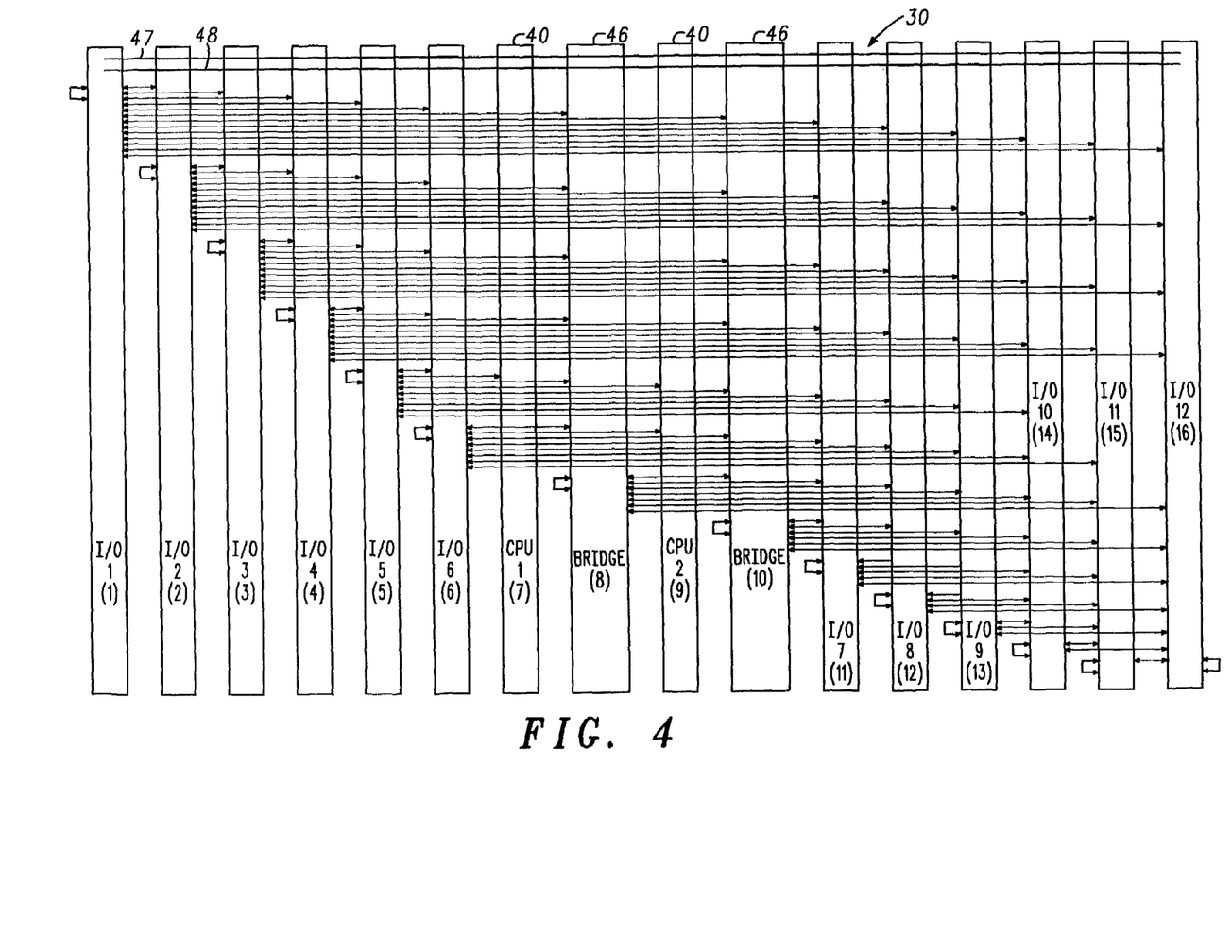
FIG. 4 is a diagram showing the IP routing on the connectors of the backplane used in the TMX of FIG. 2.

FIG. 4 is a diagram showing IP routing on the connectors of the CPX8216IP backplane. As shown therein, each connection comprises two differential pairs; Receive (Rx) and Transmit (Tx) and there is a point-to-point connection between every slot, including itself. Additionally, there are two differential pairs across backplane 30 for distributing a common clock reference 47 and a sync signal 48 to every board to maintain system synchronization.

Since the 8216IP backplane was designed for Ethernet connectivity, only some of the available interconnects need to be utilized (namely the transmit lines) in the preferred embodiment. This is due to the fact that one preferred architecture of the present invention passes data uni-directionally. In accordance with the invention, serial LVDS transmitters 54 and receivers 64 and 74 may be used instead of an Ethernet link. This also allows a higher payload data rate link between boards. To reduce cost, slots S1 through S4 may be dedicated for the input processor (INP) boards 50' as shown in FIG. 5, and the remaining slots S5-S6 and S11-S16 can receive TRC or MUX boards 70' and 60' in the 8216IP chassis. Each INP board 50' preferably includes a plurality (e.g., eleven) LVDS transmitters 54, while each TRC or MUX board 70' or 60' preferably has a smaller number (e.g., four) LVDS receivers 74 or 64. Data is preferably transferred between the transmitters and receivers using a ten bit data bus with associated start and stop bits. At a clock rate of 27 MHz, this yields a data transfer rate of 324 Mbps (12 bits×27 MHz=324 Mbps). The structure and function of this configuration is discussed in greater detail below, in connection with FIG. 13.

The backplane of the 1205IP chassis provides many of the features of the 8216 IP chassis discussed immediately above. For example, since the 1205IP backplane 30' of FIG. 6 was designed for Ethernet connectivity, only some of the available interconnects need to be utilized (namely the transmit lines) in the preferred embodiment. This is also due to the fact that the preferred architecture passes data unidirectionally. Serial LVDS transmitters 54 and receivers 74 or 64 may be used instead of an Ethernet link in order to allow a higher payload data rate link of, e.g., 216 Mbps between two boards. While slot S1' is preferably dedicated to receive the INP board 50', slot S2' or slot S3' can each receive one of an INP, TRC or MUX board (50', 70' or 60'). Finally, slot S4' receives either a TRC or MUX board 70' or 60'.

A high-level block diagram of a preferred TMX is provided in FIG. 7. The TMX can serve multiple applications, such as High Definition (HD) television and Standard Definition (SD) television Add/Drop multiplexing, advertisement splicing, IP data processing and scrambling. The input signals 22 received by TMX 20 can be in a number of widely known and used formats. These input signal formats include, for example, ASI, DHEI and DS3. While the number and type of signal inputs and outputs that can be accommodated by the system are merely a matter of design choice, up to forty ASI inputs can be supported in the system when the aforementioned preferred chassis are utilized. The output data stream formats can be any combination of ASI, DS3, SMPTE-310M or DHEI.

Figure 8:
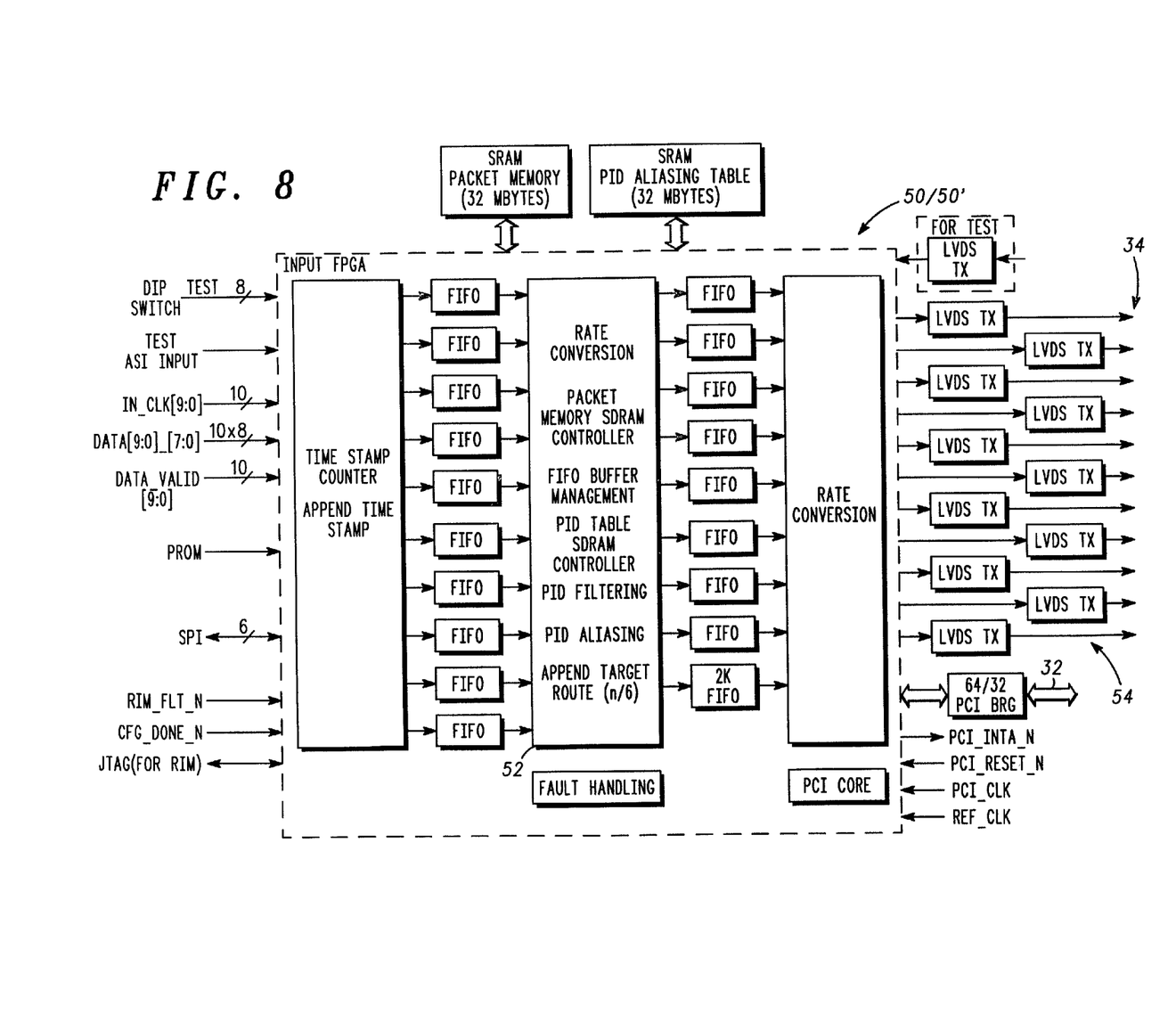
FIG. 8 is a block diagram of a representative input processor board that can be used in the TMX of FIG. 7.

A representative implementation of the input processor INP 50' is illustrated in FIG. 8. The input processor's (INP) 50 primary functions are to accept a plurality of data streams (e.g., up to ten MPEG2 data streams), to perform packet identifier (PID) filtering and aliasing, and to determine where to route the data streams for processing based on configuration data provided by the host CPU board via the control bus. In the implementation shown in FIG. 8, the INP card 50' targets TRC's or MUX's via LVDS drivers and serial bus 34, and targets the CPU via the PCI bus. While typical incoming data packet lengths are 188 bytes. Out-going packets preferably have a length of 193 bytes and three components: 1 target MAP processor byte+a 188 byte packet of content data+a 4 byte time stamp. The maximum supported data rates are 324 Mbps to each target MAP and/or MUX. Those skilled in the art will appreciate that other implementations are also possible.

Figure 9:
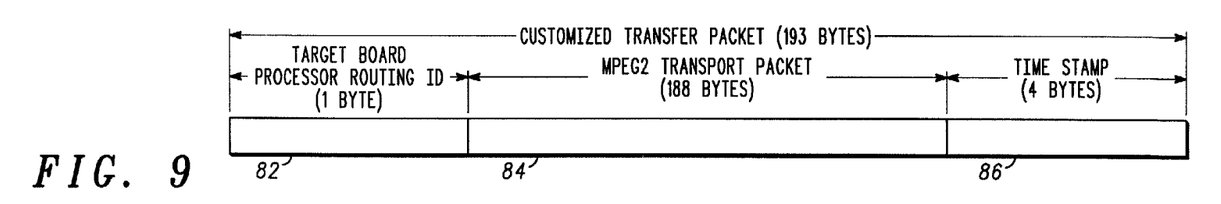
FIG. 9 illustrates a data packet configuration for use with a preferred embodiment of the invention, the packet having a routing header (1 byte), an MPEG2 packet (188 bytes) and a trailing time stamp (4 bytes)

Turning now to FIG. 9, this figure illustrates the configuration of a preferred data transfer packet 80. In accordance with the invention, incoming data is filtered for null packets, and fed into a first-in-first-out (FIFO) for rate conversion before being written to the SRAM. In accordance with a preferred embodiment of the invention, a header 82 and a footer 86 are built on top of each content data packet 80 for (in the case of FIG. 9, an MPEG2 data packet) for routing and time stamping purposes. A header 82 can, for example, be provided as the first byte of the 193 byte packet (Target Map byte) and is used to target a particular processor on a transcoder or multiplexer board receiving the data packets. The footer 86 can, for example, comprise a four byte object which follows the content data packet and is used as a time stamp. This time stamp is processed at the receiving board to correct the program clock reference (PCR). Those skilled in the art will appreciate that other implementations are also possible.

Figure 10:
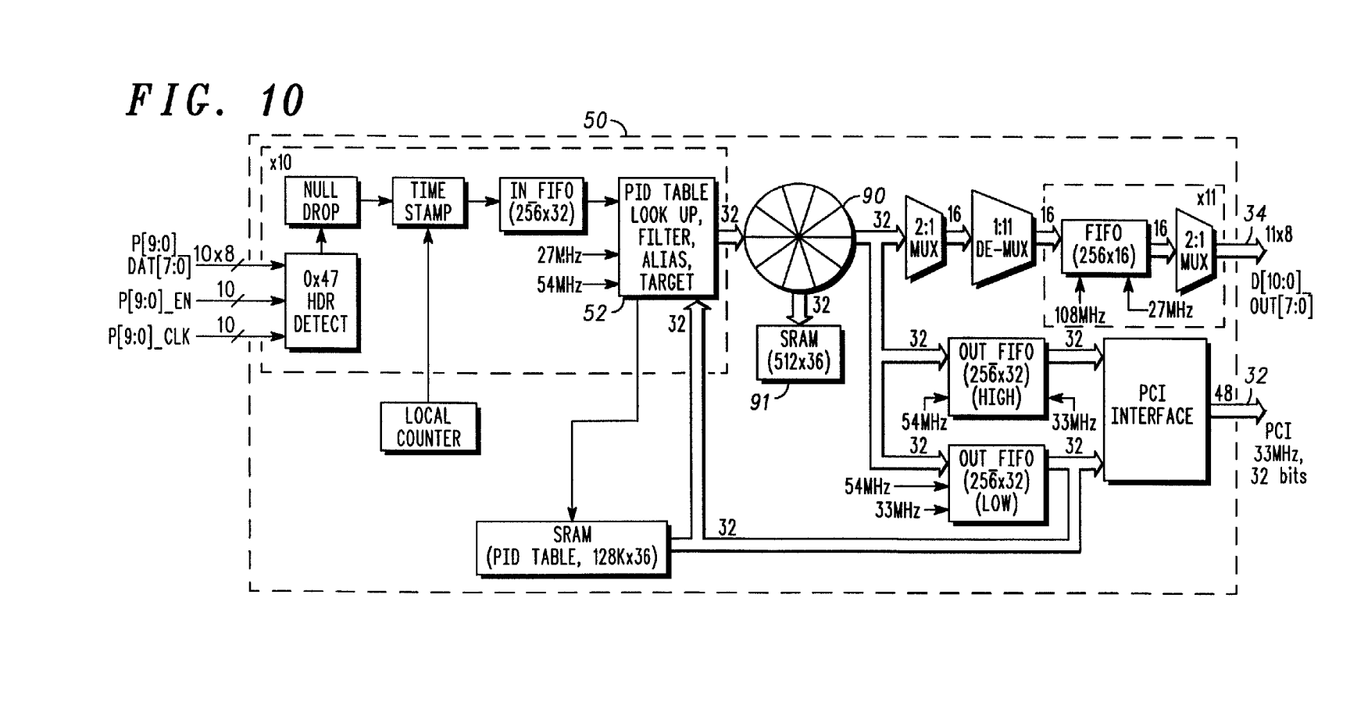
FIG. 10 is a functional block diagram of a field programmable gate array (FPGA) implementation of an input processor.

FIG. 10 is a structural block diagram of a preferred input processor 50. While those skilled in the art will appreciate that other implementations are also possible, processor 50 is implemented as a field programmable gate array (FPGA) with an SRAM memory in this representative implementation. As shown in the embodiment of FIG. 10, an SRAM wagon wheel 90 memory access scheme with ten spokes preferably runs at a preferred clock speed of 54 MHz. Table 1 shown immediately below lists a number of input data rates that are supported:

TABLE 1

| Number of INPUTS | Max Input Rate (Mbps) |
|---|---|
| 10 | 65.50 |
| 9 | 72.77 |
| 8 | 81.87 |
| 7 | 93.57 |
| 6 | 109.16 |
| 5 | 130.99 |

TABLE 1-continued

| Number of INPUTS | Max Input Rate (Mbps) |
|---|---|
| 4 | 163.74 |
| 3 | 175.00 |
| 2 | 175.00 |
| 1 | 175.00 |

In the preferred FPGA, higher data rates can be achieved by not going through the wagon wheel for all inputs where not all of the input ports receive signals. In such cases it is only necessary to go through the portion of the wagon wheel that corresponds to each enabled input. The buffer size for each port can comprise, for example, 512 packets. Since each memory access is preferably 32 bits wide, and the SRAM preferably operates at packet boundaries, 196 bytes can be transferred during each read or write operation. Taking the case in which all ten inputs are active, it takes forty-nine 54 MHz cycles for a write operation, and fifty-four 54 MHz cycles for a read operation, times ten (1,030 cycles) to complete the wagon wheel, and to thereby write or read 196 bytes to/from the SRAM for each port.

Figure 11:
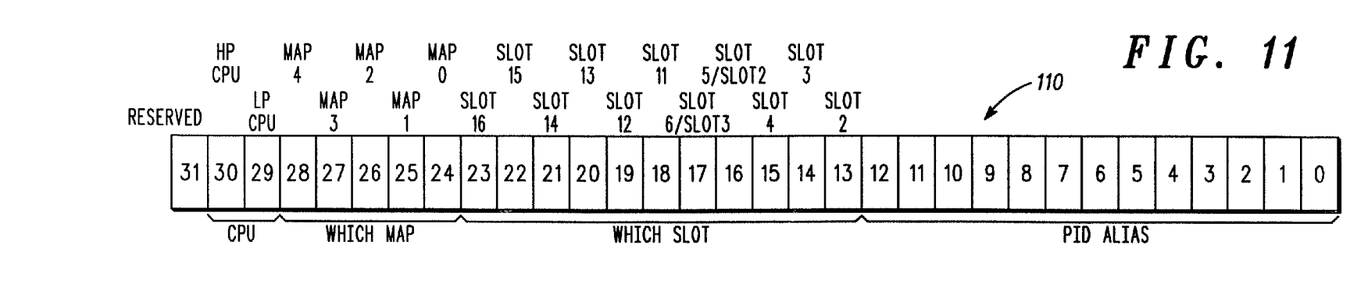
FIG. 11 illustrates a representative PID table for use with the input processor of the invention.

When the data is read out of the packet memory SRAM, the PID Table SRAM is accessed to determine the PID alias, target board, and target MAP for the packet to be processed. The SRAM is configured by the CPU via the PCI bus. The definition of each address location is shown in FIG. 11 and discussed immediately below. The actual packet memory can be divided as shown in FIG. 12.

Turning now to FIG. 11, this figure illustrates an exemplary input board PID table 110 in accordance with the present invention. As shown, each entry in PID table 110 consists of high and low priority queues for the CPU, a MAP target, a slot target and the 13-bit MPEG2 packet PID alias. In operation, INP 50 uses this data to route packets through the transport multiplexer in any one of a number of ways. For example, data could be routed to a single slot, or a number of slots, and a single MAP or a number of MAPs, and/or the CPU. Those skilled in the art will appreciate that other implementations are also possible.

Figure 12:
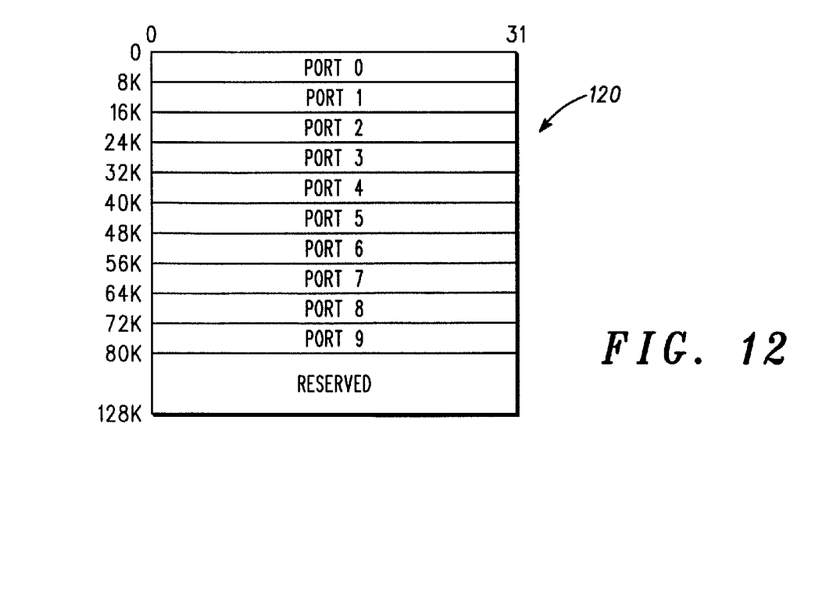
FIG. 12 shows an exemplary memory access scheme, along with memory partition, for the input processor of the invention.

A representative method 120 for accessing the memory device is illustrated, along with memory partition, in FIG. 12. Data is stored and retrieved in accordance with the invention using the concatenation of the port number and PID number to access memory locations. With this system, the upper four bits of the address refer to the port and the lower 13 bits refer to the PID. Thus, the address field is a 17-bit address field. Those of skill in the art will recognize that other addressing schemes could also be used.

Figure 13:
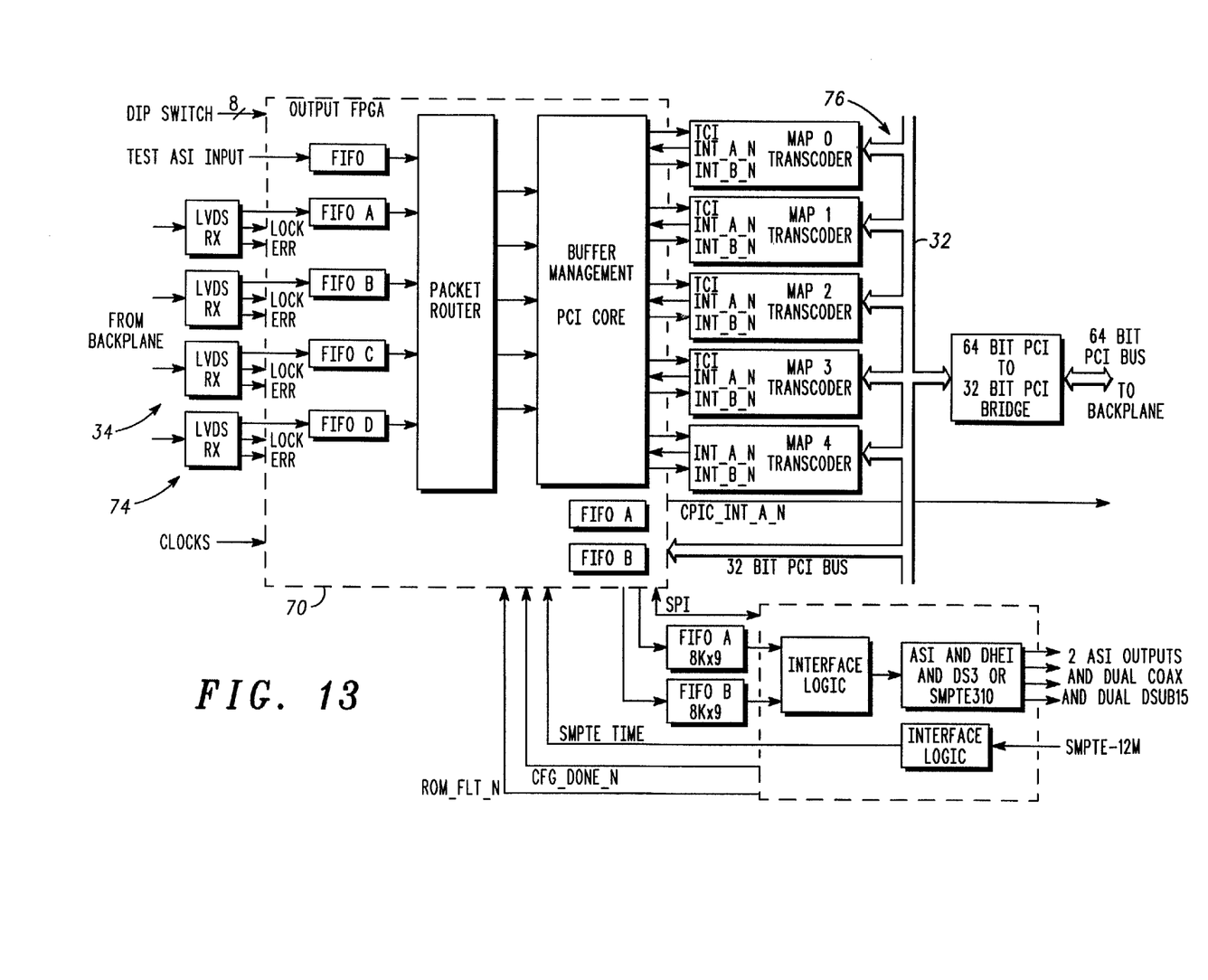
FIG. 13 is a block diagram of a transcoder board with Low Voltage Differential Signal (LVDS) receivers in accordance with a preferred embodiment of the invention.

A transcoder (TRC) 70 in accordance with one embodiment of the invention is illustrated in FIG. 13. As shown therein, a basic function of TRC 70 is to accept four LVDS data streams, and to send these streams to one of five MAP processors 76. In this embodiment, and as described above, data packets received by TRC 70 are preferably 193 bytes long; a one byte target MAP identifier, a 188 byte MPEG2 packet of content, and a four byte time stamp. In a particularly preferred embodiment, the TRC can be configured as a modified MUX card, based on special code written for such functionality being resident on one of the MAP processors of TRC 70, with the remaining four MAPs serving as transcoders. To reduce costs, TRC 70 can have a ROM connected to it. This enables the TRC to serve as the master clock to the entire system (thus driving the reference clock (27/4 MHz) to the backplane) and also the time stamp sync signal to synchronize all boards upon its terminal count. The DHEI frequencies and the 27 MHz are derived from the 44.736 MHz clock via a numerically controlled oscillator (NCO). In an alternative embodiment, the TRC is not configured to be the master clock generator. In this alternative embodiment, the system would accept the 27/4 MHz clock from the backplane, along with the time stamp sync signal, and synchronize its time stamp counter to it.

With reference now to FIG. 13, the MAP processors 76 shown therein will accept code download, configuration, and quantization and provide status and buffer characteristics via the PCI Bus. Each of the MAP processors is capable of transcoding video packets in accordance with a conventional transcoding algorithm to thereby compress the outgoing data stream. In the preferred transcoder implementation of FIG. 13, the MAP buffer delays any associated audio or data elementary streams so they can be put together with the transcoded video data. In accordance with this feature of the invention, after the video has been transcoded (and other processing such as ad-insertion has been performed), the recombined bit stream is sent to the MUX MAP via the PCI.

It should now be appreciated that the present invention provides apparatus and methods for using an Internet Protocol backplane to transport digital packets (such as MPEG2 packets) between boards in a chassis using a serial differential protocol capable of achieving a high data transfer rate. The invention, therefore, provides a solution to the problem of routing digital packets (e.g., MPEG2 packets) to target processing engines across a backplane. Additionally, the inventive solution obviates the related art requirements for custom backplane designs, together with discrete hardware, for sending data in parallel form between boards. Instead, the invention uses a backplane architecture designed specifically for IP data traffic from any slot to any slot of a chassis. It also applies a novel protocol for transmitting data serially between boards to provide an inexpensive, upgradeable and flexible hardware solution that preferably uses LVDS transmitter/receiver pairs with high link speeds of, for example, 324 Mbps. Maximum flexibility has been achieved by routing any of a plurality of MPEG2 transport streams (e.g., ten streams) to any of a number of target processors on any of a number of boards.

In one of the disclosed embodiments, a Motorola MCG 8216IP sixteen slot chassis is used to provide board-to-board data pathways. This preferred hardware solution allows packets to be sent from any one of plural input ports of an input board to any MPEG2 processing engine on any other board in the system. Low Voltage Differential Signal (LVDS) transmitters are provided on input boards, and LVDS receivers are provided on other boards. A header and a footer are preferably built on top of each data packet for routing and time stamping purposes. In the transcoder embodiment illustrated in FIG. 13, this header is provided in the first byte of a 193 byte packet and is used to target a particular one of the five processors on each transcoder board. The customized footer, which preferably comprises four bytes at the end of the entire 193 byte packet, provides a time stamp. This time stamp can be taken from a free running counter that is synchronized between the two cards (e.g., an input processor card and a transcoder card). At the receiving end, the first byte is used to route content to one of five processors on the transcoder board and is then dropped. The processor on the receiving board uses the time stamp in the last four bytes to correct the program clock reference. This hardware solution minimizes costs for the system as well as optimizes data transfer speeds. The chassis is preferably a modified compact PCI chassis, which can accommodate the IP interconnections and which uses the dedicated slot for serial inter-connections to thereby free up the PCI bandwidth for other important tasks.

While the present invention has been described in connection with what is presently considered to be the most practical and preferred embodiments, it is to be understood that the invention is not limited to the disclosed embodiments, but is intended to encompass the various modifications and equivalent arrangements included within the spirit and scope of the appended claims. With respect to the above description, for example, it is to be realized that the optimum dimensional relationships for the parts of the invention, including variations in size, materials, shape, form, function and manner of operation, assembly and use, are deemed readily apparent to one skilled in the art, and all equivalent relationships to those illustrated in the drawings and described in the specification are intended to be encompassed by the appended claims. Therefore, the foregoing is considered to be an illustrative, not exhaustive, description of the principles of the present invention.

What is claimed is:

1. A high speed Internet Protocol communications system for serially transporting digital data between communications hardware comprising:
   a chassis for receiving plural boards, the chassis comprising a backplane which includes a control data bus and a serial data bus communicatively linking the plural boards together;
   the plural boards comprising an input board for receiving an incoming parallel data stream and transmitting a differential serial data stream to the serial data bus, the input board including a serializer for converting the received parallel data stream into the differential serial data stream and a transmitter for transmitting the differential serial data stream to the serial data bus;
   the differential serial data stream comprising encoded video data packets, each of the data packets comprising a header having a target media accelerated processor identifier; and
   the plural boards further comprising at least one other board with a serial data receiver and a deserializer, the serial data receiver receiving the differential serial data stream from the serial data bus, and the deserializer converting the received differential serial data stream into an output data stream in accordance with control signals received via the control data bus.

2. The communications system of claim 1, wherein the communications system comprises a transport multiplexer.

3. The communications system of claim 1, wherein the differential serial data stream transported between the communications hardware via the serial data bus comprises MPEG2 encoded data packets, each of the data packets comprising a header having a target media accelerated processor identifier, an MPEG2 data packet and a footer having a time stamp.

4. The communications system of claim 1, wherein
   the transmitter is a low voltage differential signal transmitter;
   the receiver is a low voltage differential signal receiver; and
   data is transported unidirectionally from the transmitter to the receiver.

5. The communications system of claim 1, wherein
   the input board comprises eleven low voltage differential signal transmitters; and the at least one other board comprises four low voltage signal receivers.

6. The communications system of claim 1, having a rate of serial data transport from the input board to the at least one other board of at least about 324 Mbps; and
   wherein the control data bus comprises a compact peripheral component interconnect (cPCI) data bus.

7. The communications system of claim 1, wherein the at least one other board is a transcoder board comprising a low voltage differential signal receiver with clock recovery for receiving the differential serial data stream via the serial data bus and a media accelerator processor for generating the output data stream therefrom.

8. The communications system of claim 1, wherein the at least one other board is a time division multiplexer board comprising at least one pair of low voltage signal receiver for receiving the differential serial data stream via the serial data bus and at least one media accelerated processor.

9. The communications system of claim 1, wherein the plural boards further comprise a central processing unit (CPU) board that is communicatively linked to the input board via the control data bus.

10. The communications system of claim 9, wherein
   the differential serial data stream transported between the plural boards via the serial data bus comprises MPEG2 encoded data packets;
   the plural boards further comprise a transcoder board comprising a low voltage differential signal receiver for receiving the differential serial data stream via the serial data bus and a media accelerator processor for generating the output data stream therefrom; and
   the input board comprises a field programmable gate array comprising means for:
      performing packet identifier filtering and aliasing;
      providing the CPU with information relating to the incoming data stream;
      buffering the encoded data packets; and
      routing the encoded data packets to the media accelerator processor.

11. A system for serially transporting digital data within a transport multiplexer comprising:
   a chassis for receiving plural boards, the chassis comprising a backplane which comprises a compact peripheral component interconnect (cPCI) bus and a serial data bus communicatively linking at least one input board to at least one other board;
   a central processing unit (CPU) board communicatively linked to the cPCI bus and providing control signals to the cPCI bus;
   the at least one input board transmitting a differential serial data stream to the serial data bus in response to receipt of a parallel data stream, the at least one input board comprising a serializer for converting the received parallel data stream into the differential serial data stream and comprising a low voltage differential signal transmitter for transmitting the differential serial data stream to the serial data bus;
   the differential serial data stream comprising encoded video data packets, each of the data packets comprising a header having a target media accelerated processor identifier; and
   the at least one other board comprising a serial data receiver and a deserializer, the serial data receiver receiving the differential serial data stream from the serial data bus, and the deserializer converting the received differential serial data stream into an output data stream in accordance with control signals received from the CPU board via the cPCI bus.

12. The system of claim 11, wherein the differential serial data stream transported between the input board and the other board via the serial data bus comprises MPEG2 encoded data packets, each of the data packets comprising a header having a target media accelerated processor identifier, an MPEG2 data packet and a footer having a time stamp.

13. The system of claim 11, wherein
the receiver is a low voltage differential signal receiver with clock recovery; and
data is transported unidirectionally from the transmitter to the receiver.

14. The system of claim 11, wherein
the input board comprises eleven low voltage differential signal transmitters; and the at least one other board comprises four low voltage signal receivers.

15. The system of claim 11, wherein the at least one other board is a transcoder board comprising a low voltage differential signal receiver for receiving the differential serial data stream via the serial data bus and a media accelerated processor for generating the output data stream therefrom.

16. The system of claim 11, wherein
the system comprises at least two other boards; and
the input board further comprises:
plural ports for receiving plural input data streams;
means for performing packet identifier filtering and aliasing of the input data streams;
means for capturing control information from the input data streams;
means responsive to receipt of the plural input data streams for transmitting plural independent differential serial data streams to the at least one other board via the serial data bus; and
means for buffering the differential serial data streams to thereby reduce the possibility of data bottlenecks occurring.

17. A system for serially transporting digital data comprising:
means for receiving a parallel data stream, for serializing the parallel data stream and for transmitting the serialized data stream to a serial data bus, the serialized data stream comprising encoded video data packets, each of the data packets comprising a header having a target media accelerated processor identifier; and
means for receiving the serialized data stream via the serial data bus and for converting the received serialized data stream into an output data stream in accordance with control signals received via a control data bus; and
means for communicatively linking a plurality of boards via the control data bus and the serial data bus.

18. The system of claim 17, wherein the serialized data stream transported via the serial data bus comprises MPEG2 encoded data packets, each of the data packets comprising a header having a target media accelerated processor identifier, an MPEG2 data packet and a footer having a time stamp.

19. The system of claim 17, wherein
the means for transmitting comprises a low voltage differential signal transmitter;
the means for receiving the serialized data stream comprises a low voltage differential signal receiver; and
the serialized data stream is transported unidirectionally from the transmitter to the receiver.

20. The system of claim 17, wherein the means for receiving the serialized data stream comprises a transcoder with a low voltage differential signal receiver for receiving the serialized data stream via the serial data bus and a media accelerated processor for generating the output data stream therefrom.

21. A high speed Internet Protocol backplane for communicatively linking an input board having a serializer with an other board having a serial data receiver and a deserializer, the backplane comprising:
a transport multiplexer (TMX);
a compact peripheral component interconnect (cPCI) control data bus of the TMX for delivering control data from the input board to the other board; and
a serial data bus of the TMX for delivering differential serial content data from the input board to the other board, the differential serial content data comprising encoded video data packets, each of the encoded video data packets comprising a header having a target media accelerated processor identifier;
wherein the control data bus and the serial data bus comprise independent communications pathways in the TMX linking the input board and the other board together, the input board being configured to receive parallel content data and to transmit the differential serial content data to the other board via the TMX, and the other board being configured to receive the differential serial content data from the input board via the TMX and to convert the received differential serial content data into output data in accordance with the control data received from the input board via the TMX.

22. A method for serially transporting digital data between a first board and at least one other board within a chassis comprising:
communicatively linking the first board and the at least one other board via a control data bus and a serial data bus;
receiving plural parallel data streams;
specifying a routing configuration for the plural parallel data streams;
serializing the parallel data streams in accordance with the routing configuration;
transmitting the serialized data stream to the serial data bus, the serialized data stream comprising encoded video data packets, each of the data packets comprising a header having a target media accelerated processor identifier;
receiving the serialized data stream via the serial data bus and the control data via the control data bus; and
converting the received serial data stream into an output data stream in accordance with control data received via the control data bus.

23. The method of claim 22, wherein the serialized data stream comprises MPEG2 encoded data packets, each of the data packets comprising a header having a target media accelerated processor (MAP) identifier, an MPEG2 data packet and a footer having a time stamp.

24. The method of claim 22, wherein
transmitting the serialized data stream comprises transmitting a low voltage differential signal;
receiving the serialized data stream comprises receiving the low voltage differential signal; and
the serialized data stream is transported unidirectionally.

* * * * *

UNITED STATES PATENT AND TRADEMARK OFFICE
CERTIFICATE OF CORRECTION

PATENT NO.        : 7,408,961 B2
APPLICATION NO.   : 10/124610
DATED             : August 5, 2008
INVENTOR(S)       : Kaku Page 1 of 1

It is certified that error appears in the above-identified patent and that said Letters Patent is hereby corrected as shown below:

COLUMN 1:
Line 50: Please delete "modem" and replace with --modern--

COLUMN 3:
Line 61: After "IP", please insert --bus--

Signed and Sealed this

Twenty-second Day of September, 2009

David J. Kappos
*Director of the United States Patent and Trademark Office*